June 23, 1925.

L. H. VERVOORT

BEARING

Filed May 23, 1922

Inventor:
Lambert H. Vervoort
Gray and Lilly
Attorneys.

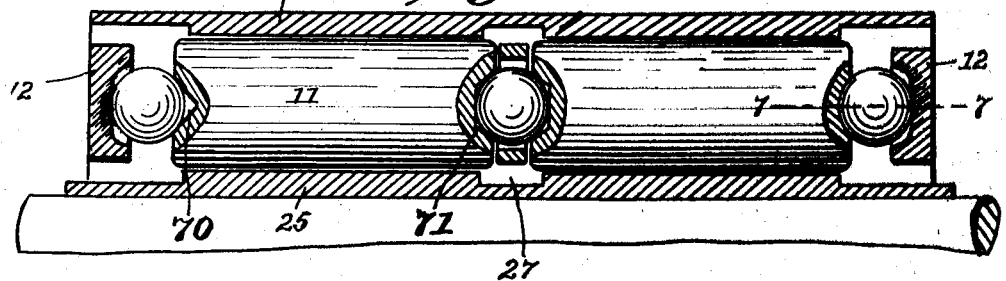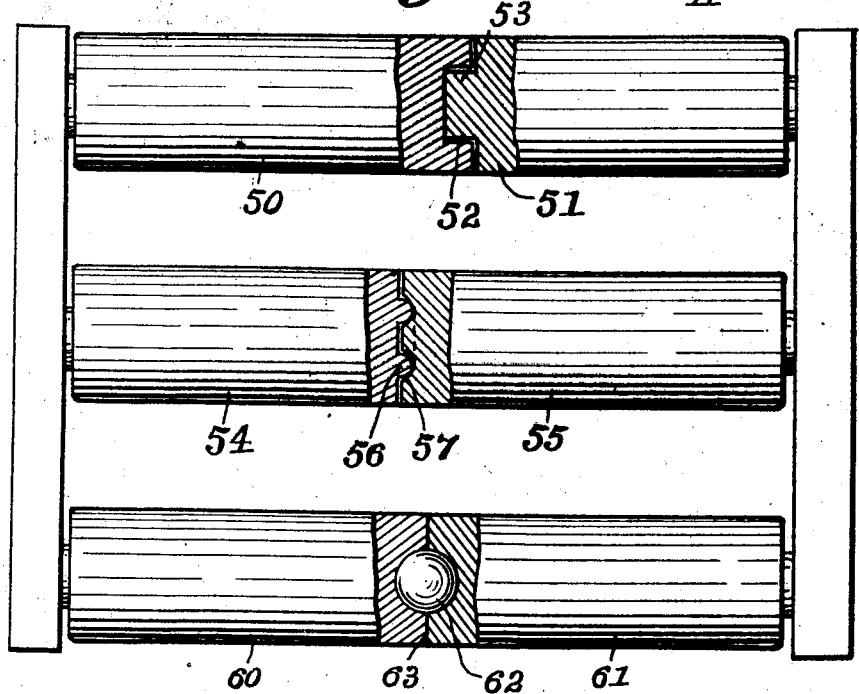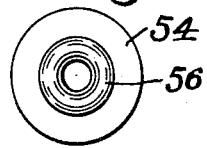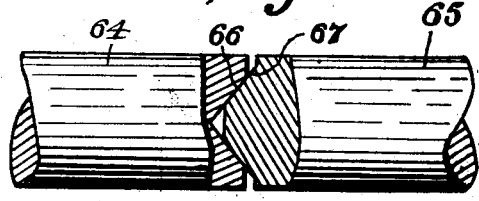

June 23, 1925.  
L. H. VERVOORT  
BEARING  
Filed May 23, 1922

Inventor  
Lambert H. Vervoort.  
Gray and Lilly  
Attorneys.

Patented June 23, 1925.

1,543,039

UNITED STATES PATENT OFFICE.

LAMBERT H. VERVOORT, OF WASHINGTON, DISTRICT OF COLUMBIA.

BEARING

Application filed May 23, 1922. Serial No. 563,085.

*To all whom it may concern:*

Be it known that I, LAMBERT H. VERVOORT, residing at Washington, District of Columbia, and a citizen of the United States of America, have invented certain new and useful Improvements in Bearings, of which the following is a specification.

My invention relates to roller bearings, its general object being to provide a bearing simple in construction, efficient in the performance of its function, and capable of being easily and cheaply made.

More specifically, one of my objects is to provide a cage for a roller bearing having stayed apart end plates with radially elongated bearing depressions or sockets in their inner faces, which bearing depressions restrain the rollers mounted in the cage from relative movement circumferential of the bearing while permitting limited radial movement for proper adjustment of the rollers to the bearing surfaces.

A further object is to provide metal end plates for roller bearing cages having bearing depressions with integral faces harder and denser than the remainder of the plates.

A further object is to provide transversely divided rollers for elongated bearings, permitting radial adjustment of the rollers, but at the same time maintaining the divided roller with its axis in a plane passing through the axis of the bearing.

A further object is to provide an elongated bearing with divided rollers, and in which there will not be formed objectionable ridges at the points of roller division.

Other objects and results of my invention will appear as the description proceeds.

The annexed drawings and the following description disclose what I at present consider the best embodiment of my invention, together with a few of the other possible embodiments of the broader features of my invention.

In the drawings:

Fig. 6 is a partial cross section of a bearing, showing the roller and contacting surfaces.

Fig. 7 is a detail view on the line 7—7 of Fig. 6.

Fig. 12 is a view of a bearing with jointed rollers.

Fig. 13 is an end view of one form of roller joint.

Fig. 14 is a detail of another form of roller joint.

Figure 1:
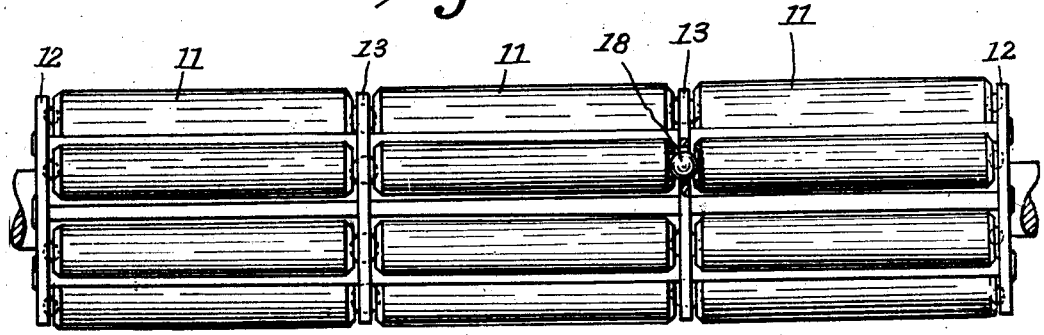
Figure 1 shows a view of my preferred form of elongated bearing, with the outer sleeve removed.

In the preferred form of my invention shown in Fig. 1, the bearing cage consists of a cylindrical series of rollers 11 mounted in a roller cage consisting of annular end plates 12 and intermediate plates 13, stayed in spaced parallel relation by stay rods 14. In each end plate there is a series of bearing depressions or sockets, 15, radially elongated, as shown. I prefer to form these depressions by supporting the outer face of the plate on a support having a plane, unyielding surface, and die pressing the depressions in the inner face of the plate. The plate is easily and cheaply made in this way, and the metal forming surfaces are rendered harder and more close grained than the remainder of the metal in the plate. In this way the surface of the bearing depressions is given a very smooth and hard wearing surface, while at the same time the remainder of the integral ring is not rendered unduly brittle.

Figure 4:
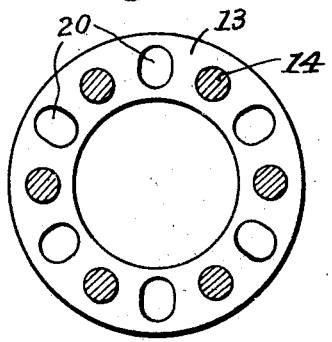
Fig. 4 is a cross section of the roller cage with rollers and balls removed.
Figure 5:
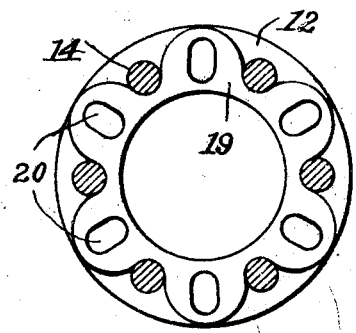
Fig. 5 is similar to Fig. 4, but showing an alternative form of intermediate plate.

The rollers 11 are provided in each end with ball seats 16. Balls 17 are seated in the ends of the rollers next to plates 12 and are also seated in the bearing depressions 15. Between the rollers at the intermediate plates 13 I prefer to use single balls 18. While these plates 13 might be provided with depressions like the bearing depressions 15, I prefer, whether such plates are as shown in Figures 1 and 4 or whether shown as at 19 in Figure 5 with notches for the reception of stay rods 14, to provide them with elongated slots 20 for the reception of balls 18. The purpose of notching the ring 19 shown in Figure 5 is to make the ring lighter by cutting away unnecessary metal.

Figure 3:
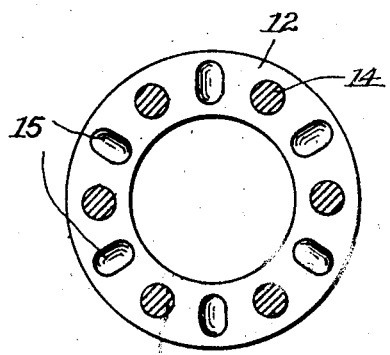
Fig. 3 is an inner face view of an end plate.
Figure 8:
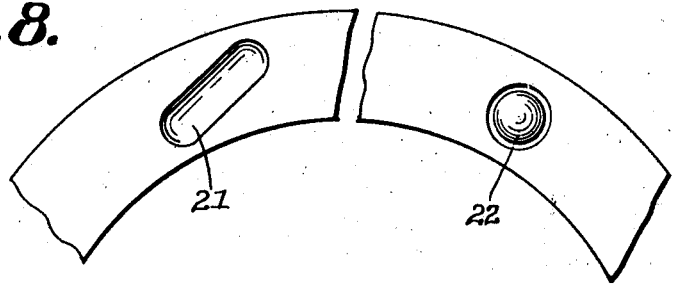
Fig. 8 is a detail view of alternative forms of bearing depressions.

While I prefer to form the depressions in the shape shown in Figures 3 and 7, some of the benefits of the die-formed depressions are independent of the particular shape of said depressions and would be equally beneficial if the depressions were formed as shown in Figure 8 elongated diagonally as at 21, or round in cross section as shown at 22.

In Figure 6 I show a section of a portion of the inner bearing surface 25 and an outer bearing surface 26 notched respectively at 27 and 28 opposite the space between the rollers. If these notches are not provided the bearing surfaces may wear where contacted by the rollers, leaving ridges between the rollers, and then any longitudinal movement of the rollers with respect to the bearing surfaces would cause the ends of the rollers to ride on such ridges with injurious effects.

Figure 9:
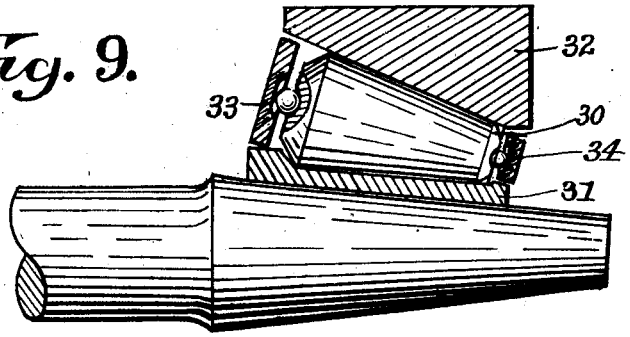
Fig. 9 is a partial section of a conical bearing.

In Figure 9 is shown a partial section of a bearing having a conical roller 30 with inner bearing member 31, outer bearing member 32, with the cage plates 33 and 34. In such a case it is preferred to make the ring, bearing, seat and ball at the large end of the roller proportionately larger than the corresponding ring bearing seat and ball at the smaller end of the roller.

Figure 10:
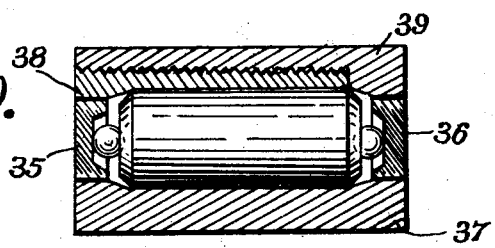
Fig. 10 is a partial section of a double thrust bearing.

In Figure 10 is shown a partial section of a double thrust bearing with cage rings 35 and 36, similar to plates 12 in the inner bearing member 37 and outer bearing member 38. In this case, in order for conveniently assembling the bearing and bearing members, it is preferred to provide the outer bearing member with a screw threaded sleeve 39 having the shoulder at one end to take the end thrust. The inner bearing member may be made sectional instead of the outer bearing, or both may be made sectional.

For reasons which will be explained later, the rings with the elongated bearing seats will be kept centered so that very little play is required between these rings or end plates and the outer and inner bearing surfaces. The closeness with which these plates may be made to fit the bearing members when desirable for purposes of taking end thrust, is indicated in Figure 10. The reason that the rings are prevented from assuming an eccentric position is that the rollers are held by the bearing surfaces at substantially constant distances apart, and this being so, any tendency of the end plate to fall, for example, is overcome by the close fit of the balls 17 in the bearing depressions 15 at the sides of the plate, as indicated in Figure 7.

Figure 11:
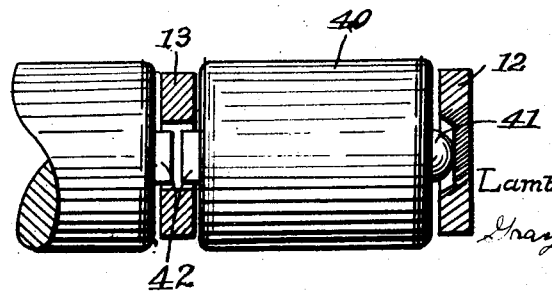
Fig. 11 is a partial section of a bearing having integral projections on the rollers in place of the balls shown in Fig. 1.

In Figure 11 rollers 40 are shown with semi-spherical projections on the outer ends as at 41, and with cylindrical projections on the inner ends as at 42.

Figure 2:
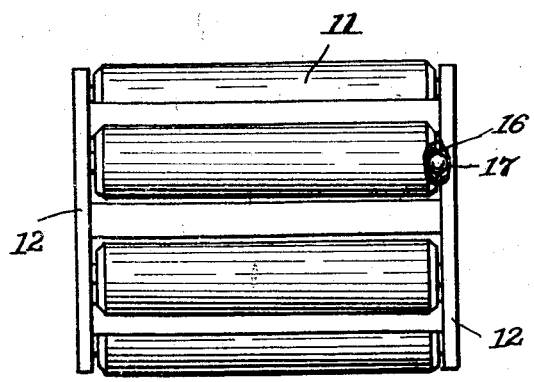
Fig. 2 shows the roller and roller cage of a short bearing.

While I prefer the form shown in Figures 1 and 2, using the balls for anti-friction purposes, some benefits of some of the features can be realized with the integral projections shown in Figure 11, or similar projections.

Under some circumstances, and especially where the rollers are of small diameter and excessive expense prohibitive, the rollers may be divided transversely and united by various forms of interlocking joints to keep the sections of the rollers in substantial alinement while allowing their relative rotation. This is desirable in comparatively long rollers to avoid the torsional strain on the rollers, which might result from slight differences in the diameters of the bearing surfaces at the two ends of the roller. In Figure 12 are shown three forms of such interlocking joints; in one the roller sections 50 and 51 are joined together by means of a cylindrical socket 52 in section 50 and a pin 53 on section 51 fitting into said socket; in the next form the roller sections 54 and 55 are fitted together by means of a ring 56 on section 54 entering groove 57 on section 55. It is preferred to make the groove of slightly larger diameter in cross section than the ring so that the roller sections will contact only along one circular line.

Roller sections 60 and 61, approximating in form the shape of the rollers 11, may be used with an interposed ball 62 in semi-spherical cavities in the meeting ends of the sections.

In Figure 14 roller sections 64 and 65 are indicated joined together by a conical recess 66 in section 64 and a projection 67 on section 65 in the shape of a frustum of a cone. Where this form of roller is used, that is a roller transversely divided, it is preferred to have the divisions of successive rollers staggered, as indicated in Figure 12, in order to avoid uneven wear on the bearing surfaces.

In Figure 6 rollers are shown with different forms of sockets in their ends. While I prefer sockets which are formed to make a close fit to the cooperating balls, conical sockets such as shown at 70, or sockets shaped like the frustum of a cone as shown at 71, or other suitable forms of sockets may be used, if preferred.

In the annexed drawings and above description I have shown the form of bearing at present preferred by me and various illustrative modifications which may be used and still retain some of the benefits of the broader features of my invention, but no attempt has been made to show all of the various modifications which might be used and therefore I do not wish my invention to be limited beyond the terms of the annexed claims.

I claim:

1. In a bearing, in combination, a roller cage comprising two end plates stayed apart, the said end plates being each provided on its inner face with radial elongated sockets spaced apart, rollers mounted between said plates, each roller being provided with a ball seat in each end thereof, and balls mounted between said rollers and said end plates and having radial play in said sockets in the end plates.

2. In a bearing, a roller cage comprising two end plates stayed apart, each of the said end plates being provided with radially elongated bearing depressions spaced apart on its inner face.

3. In a bearing, a roller cage comprising two metal end plates stayed apart, each of the said end plates being provided on its inner face with bearing depressions spaced apart, the faces of said depressions being integral with and of harder metal than the remainder of said plates.

4. In a bearing, a roller cage comprising two end plates stayed apart, each of the said end plates having its outer face in one plane, and having in its inner face spaced apart die pressed bearing depressions.

5. In a bearing, in combination, a roller cage comprising two end plates stayed apart, each of the said end plates being provided on its inner face with radially elongated bearing depressions, rollers mounted between said plates and maintained by said bearing depressions against movement circumferentially of the bearing relative to the end plates, while being permitted limited radial movement, each of said rollers being divided transversely of its axis, and means to maintain the divided rollers in alinement with the bearing depressions.

6. In a bearing, in combination, a roller cage consisting of end plates spaced apart, each of the said end plates being provided on its inner face with radially elongated bearing depressions, an intermediate plate stayed between the end plates, radially elongated slots through said intermediate plate in alinement with said bearing depressions, rollers mounted between each of said slots and the alined bearing depressions, each roller being provided with a ball seat in each end thereof, balls mounted in said bearing depressions and engaging the outer ends of said rollers, and balls mounted in said slots and engaging the inner ends of said rollers.

7. In combination, a cylindrical shaft, a cylindrical sleeve surrounding and spaced from said shaft, a plurality of cylindrical series of rollers interposed between said shaft and said sleeve, said series being placed end to end slightly spaced apart longitudinally, and there being grooves in said shaft and in said sleeve opposite the spaces between the ends of said series.

8. In a bearing, in combination, a roller cage comprising two end plates stayed apart, the said end plates being each provided on its inner face with radial elongated sockets spaced apart, rollers mounted between said plates, each roller being provided with means connected concentrically therewith, and having radial plays in said sockets, whereby the rollers are maintained against movement circumferentially of the end plates, but are permitted limited radial movement therein.

In testimony whereof I hereunto affix my signature.

LAMBERT H. VERVOORT.